R. SANDIFORD.
Plow Clevis.
No. 78,542.
Patented June 2, 1868.
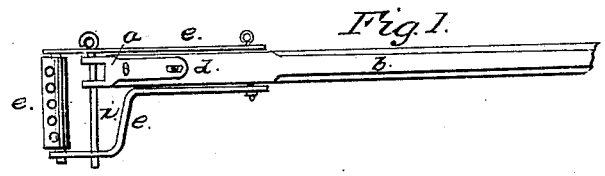
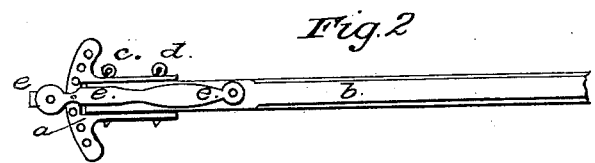
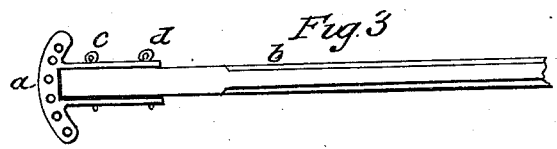
WITNESSES:
INVENTOR
Roger Sandiford

UNITED STATES PATENT OFFICE.

ROGER SANDIFORD, OF JOLIET, ILLINOIS.

Letters Patent No. 78,542, dated June 2, 1868.

IMPROVEMENT IN PLOUGH-CLEVIS.

The Schedule referred to in these Letters Patent and making part of the same.

Be it known that I, ROGER SANDIFORD, of the city of Joliet, in Will county, and State of Illinois, have invented a new and useful Improvement on a Plough-Clevis; and that I do hereby declare the following to be a full, clear, and exact description of the same, reference being had to the annexed drawings, making a part of this specification, in which—

Figure 1 is a plane view on the top,

Figure 2, a side elevation, and

Figure 3 a side elevation of a part of said invention.

The nature of my invention consists in the construction and arrangement of a plough-clevis, by which it is made easy to at once regulate the depth to be cut, and guide the plough to either side.

$a$, fig. 1, is a view of a double segmental clevis, secured to the plough-beam $b$ by means of the regulating-bolts $c$ and $d$, as in the ordinary manner. In conjunction with the clevis $a$, I use the transverse oscillating-clevis $e$, regulated at any joint, up or down, by means of the regulating-bolt $i$ passing through the double row of holes in the segmental clevis $a$, more particularly shown in fig. 2. It will be seen that by elevating or lowering the outer end of the clevis $e$, any depth may be obtained, and by regulating the draught-line, by means of the row of holes in said clevis, any width of furrow may be cut, consistent with the size of the clevis and plough. The clevis $e$ is intended to be reversible, so as to give greater facilities for changing the lateral direction of the plough, and may be used in conjunction with the common clevis. The clevis, $a$, is double, for the purpose of preventing the other clevis from becoming twisted or getting out of shape, and may be used without the clevis $e$, as shown in fig. 3. When used alone, the double-tree may be attached to either of the projecting segments, or between them, as is desired.

Having thus described my invention, what I claim as new in my invention, and desire to secure by Letters Patent, is as follows:

1. I claim the double segmental clevis $a$, when constructed, operating, and arranged substantially as and for the purposes set forth.

2. I claim the transverse oscillating-clevis $e$, when constructed and arranged as and for the purposes described.

3. I claim the combination and arrangement of the segmental clevis $a$ and transverse oscillating-clevis $e$, when arranged, constructed, and operating as and for the purposes set forth.

ROGER SANDIFORD.

Witnesses:
 THOS. H. HUTCHINS,
 F. L. CAGWIN.